(12) United States Patent  
Mancini et al.

(10) Patent No.: US 9,039,853 B2  
(45) Date of Patent: May 26, 2015

(54) PROCESS AND PLANT FOR BUILDING TYRES

(75) Inventors: Gianni Mancini, Milan (IT); Maurizio Marchini, Milan (IT); Adriano Girotto, Treviso (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 13/515,789

(22) PCT Filed: Nov. 29, 2010

(86) PCT No.: PCT/IB2010/055473  
§ 371 (c)(1),  
(2), (4) Date: Aug. 7, 2012

(87) PCT Pub. No.: WO2011/077296  
PCT Pub. Date: Jun. 30, 2011

(65) Prior Publication Data  
US 2013/0000823 A1    Jan. 3, 2013

Related U.S. Application Data

(60) Provisional application No. 61/282,313, filed on Jan. 20, 2010.

(30) Foreign Application Priority Data

Dec. 23, 2009  (IT) .............................. MI2009A2282

(51) Int. Cl.  
*B29D 30/08* (2006.01)  
*B29D 30/00* (2006.01)  
(Continued)

(52) U.S. Cl.  
CPC .......... *B29D 30/005* (2013.01); *B29D 30/0016* (2013.01); *B29D 2030/105* (2013.01); *B29D 2030/202* (2013.01)

(58) Field of Classification Search  
CPC .. B29D 30/005; B29D 30/10; B29D 30/0016; B29D 30/20; B29D 2030/105; B29D 30/202  
USPC ........... 156/111, 133, 396; 294/213; 81/57.21  
See application file for complete search history.

(56) References Cited

U.S. PATENT DOCUMENTS 3,687,756 A * 8/1972 Appleby ....................... 156/111  
3,709,072 A * 1/1973 Rogers ......................... 81/57.13  
(Continued)

FOREIGN PATENT DOCUMENTS

CN       1410251 A    4/2003  
CN       1668453 A    9/2005  
(Continued)

OTHER PUBLICATIONS

International Search Report from the European Patent Office for International Application No. PCT/IB2010/055473, mailing date Aug. 30, 2011.

(Continued)

*Primary Examiner* — Martin Rogers  
(74) *Attorney, Agent, or Firm* — Finnegan, Henderson, Farabow, Garrett & Dunner, L.L.P.

(57) ABSTRACT

A plant for building tires for vehicle wheels, includes at least one forming drum having a supporting shaft axially projecting from opposite sides relative to a central body. A handling device is adapted to engage the forming drum and transfer it between at least one loading/unloading location and a work location provided for carrying out at least one process working on the forming drum. The handling device includes a grip assembly carrying at least two grip members each engaging the supporting shaft in the vicinity of each of the end portions thereof, and at least one motor associated with at least one of said grip members for driving the forming drum in rotation while the at least one process working is being carried out in the work location.

5 Claims, 5 Drawing Sheets

(51) Int. Cl.
*B29D 30/10* (2006.01)
*B29D 30/20* (2006.01)

(56) References Cited

U.S. PATENT DOCUMENTS

| | | | | |
|---|---|---|---|---|
| 4,059,477 | A | * | 11/1977 | Wesley .................. 156/479 |
| 4,314,864 | A | * | 2/1982 | Loeffler et al. ............. 156/111 |
| 4,443,290 | A | * | 4/1984 | Loeffler et al. ............. 156/396 |
| 5,351,582 | A | * | 10/1994 | Snyder et al. ................ 81/57.17 |
| 5,848,947 | A | * | 12/1998 | Fornasiere et al. ............. 474/96 |
| 7,104,303 | B2 | * | 9/2006 | Lemaire et al. ............. 156/414 |
| 7,195,047 | B2 | * | 3/2007 | Sieverding et al. ........... 156/396 |
| 2003/0056880 | A1 | | 3/2003 | Lemaire et al. |
| 2003/0056881 | A1 | | 3/2003 | Lemaire et al. |
| 2005/0103448 | A1 | | 5/2005 | Lemaire et al. |
| 2007/0187018 | A1 | | 8/2007 | Lacagnina et al. |
| 2007/0267125 | A1 | | 11/2007 | Mancini |
| 2008/0290539 | A1 | * | 11/2008 | Bruschelli ................... 264/40.4 |
| 2010/0139844 | A1 | * | 6/2010 | Lundell ...................... 156/110.1 |
| 2011/0126962 | A1 | | 6/2011 | Mancini et al. |

FOREIGN PATENT DOCUMENTS

| | | |
|---|---|---|
| JP | S58-217239 | 12/1983 |
| JP | 2005-170044 | 6/2005 |
| WO | WO 00/35666 A1 | 6/2000 |
| WO | WO 01/36185 A1 | 5/2001 |
| WO | WO 2004/024430 A1 | 3/2004 |
| WO | WO 2005/011967 A1 | 2/2005 |
| WO | WO 2009/040594 A1 | 4/2009 |
| WO | WO 2009/128046 A1 | 10/2009 |

OTHER PUBLICATIONS

Office Action for related Chinese Patent Application No. 201080058394.6, dated Apr. 2, 2014.

English-language Abstract of JP 2005-170044 (original date Jun. 30, 2005).

English-language translation of Notification of Reasons for Rejection issued Aug. 21, 2014 by the Japan Patent Office in corresponding Application No. JP 2012-545490 (5 pages).

Notification of Reasons for Rejection issued Aug. 21, 2014 by the Japan Patent Office in corresponding Application No. JP 2012-545490 (4 pages).

* cited by examiner

PROCESS AND PLANT FOR BUILDING TYRES

CROSS REFERENCE TO RELATED APPLICATIONS

This application is a national phase application based on PCT/IB2010/055473, filed Nov. 29, 2010, which claims the priority of Italian Patent Application No. MI2009A002282, filed Dec. 23, 2009, and the benefit of U.S. Provisional Application No. 61/282,313, filed Jan. 20, 2010, the content of all of which is incorporated herein by reference.

BACKGROUND OF THE INVENTION

1. Field of the Invention

The present invention relates to a process and a plant for building tyres.

In greater detail, the invention concerns the process and the equipment used for building the green tyre, to be subsequently submitted to a curing cycle for obtaining the final product.

2. Description of the Related Art

A tyre for vehicle wheels generally comprises a carcass structure including at least one carcass ply having respectively opposite end flaps in engagement with respective annular anchoring structures, integrated into the regions usually identified as "beads", having an inner diameter substantially corresponding to a so-called "fitting diameter" of the tyre on a respective rim.

Associated with the carcass structure is a belt structure comprising one or more belt layers, placed in radial superposed relationship on each other and on the carcass ply, having textile or metallic reinforcing cords with a crossed orientation and/or substantially parallel to the circumferential extension direction of the tyre. A tread band is applied at a radially external position to the belt structure, which tread band too is made of elastomeric material like other semifinished products constituting the tyre.

In addition respective sidewalls of elastomeric material are applied at an axially external position onto the side surfaces of the carcass structure, each extending from one of the side edges of the tread band until close to the respective annular anchoring structure to the beads. In tyres of the "tubeless" type, an air-tight coating layer, usually referred to as "liner" covers the inner tyre surfaces.

The carcass structure and belt structure are generally made separately from each other in respective work stations, to be then mutually assembled.

After building of the green tyre carried out through assembly of respective components, a curing and molding treatment is generally carried out which aims at determining the structural stabilisation of the tyre through cross-linking of the elastomeric compounds and impressing the same with a desired tread pattern and possible distinctive graphic marks at the tyre sidewalls.

Known are production processes in which, as disclosed in WO 01/36185 for example, in the name of the same Applicant, the structural tyre elements are manufactured on a suitably-shaped toroidal forming support, by sequentially laying a plurality of elementary components thereon, which components for example consist of rubberised individual cords or cords cut to size parallelly gathered in the form of strip-like elements, particularly used in making the carcass and belt structures, and continuous elongated elements of elastomeric material, particularly used for making other structural elements of the tyre such as tread band, sidewalls, liner, fillers, auxiliary support inserts, for example.

According to the aforesaid document WO 01/36185 and document WO 00/35666, in the name of the same Applicant as well, the elementary components are applied to, and suitably distributed on the forming support while the latter is being supported in overhanging at a shank coaxially projecting from the forming support through a robotized arm. The robotized arm sets the toroidal support in rotation around its axis and suitably moves it in front of an extruder or other dispensing device for determining the controlled distribution of the elementary components, based on a predetermined deposition schedule pre-set on a computer.

WO 2009/040594 in the name of the same Applicant, discloses a plant and a process for producing tyres comprising the following steps: a) forming a carcass structure of a green tyre on a first building drum in at least one carcass-building line; b) forming a crown structure on an auxiliary drum, in at least one crown structure-building line; c) shaping the carcass structure into a toroidal conformation so as to couple it to the crown structure in at least one assembling and shaping station for the tyre being processed. Operation of the assembling and shaping station is synchronised with that of the carcass-building line and the crown structure-building line. Each carcass structure remains in engagement on the respective building drum at least until completion of the shaping step. The built tyre is molded and cured in a curing and molding line separated from the assembling and shaping station. Robotized arms carry out transfer of the building drums from the carcass-building line to the assembling and shaping station, as well as transfer of the auxiliary drums from the crown structure-building line to the assembling and shaping station, and also between the different work stations provided along the crown structure-building line.

WO 2009/128046 also in the name of the same Applicant, describes a plant comprising an assembling station in which a carcass sleeve and an outer sleeve previously manufactured in respective building lines, are mutually coupled. Integrated into the assembling station are engagement devices that can be alternately coupled to an auxiliary drum carrying an outer sleeve previously formed in the crown structure-building line, and to a building drum carrying a carcass sleeve formed in the carcass-building line.

These engagement devices comprise a powered chuck and a footstock designed to engage a first and a second end respectively of a drum-supporting shaft, projecting on opposite sides from the respective building drum/auxiliary drum.

The outer sleeve is picked up from the auxiliary drum previously associated with the engagement devices, to be then coupled to the carcass sleeve carried by the building drum associated with the respective engagement devices in place of the auxiliary drum.

A robotized arm carrying a fork-shaped end portion carries out transfer of the building drum from the carcass-building line to the engagement devices provided in the assembling station.

SUMMARY OF THE INVENTION

The Applicant has recently tried to increase the daily productivity of processes and plants in particular of the type described in WO 2009/0405941 and WO 2009/128046, while maintaining a high operating flexibility and high quality levels.

The Applicant has however verified that processes and plants for example conceived according to the aforesaid documents can appear to be unsuited in some production contexts, in particular where use of structurally complicated forming drums is required, i.e. drums provided with expansion and contraction mechanisms and/or equipped with axial-extension accessories for supporting some parts of the tyre under particular working steps, where the forming drum weight and/or stresses applied on said drum during working take important values.

In this context, it is the Applicant's opinion that it is advantageous for the forming drum to be simultaneously supported at both ends of its supporting shaft when the process working and transfer from and to the respective work location is being carried out.

The Applicant has in addition perceived that it is necessary to reduce the required time for enabling the forming drum to be steadily retained at its opposite ends and driven in rotation for carrying out the process working in the work location.

The Applicant has finally found that by use of a handling device capable of simultaneously reaching and engaging the opposite ends of the supporting shaft of the forming drum, through coupling of a motor to the shaft for driving the drum itself in rotation simultaneously with the engagement of said ends, an important reduction can be achieved as regards the time required both for getting the forming drum ready to carry out the process workings in the work location, and for releasing the drum itself in the loading/unloading location.

In greater detail, in a first aspect, the invention relates to a process for building tyres, comprising:
  engaging a forming drum designed to carry a tyre being processed, by means of at least one handling device, in the vicinity of both the end portions of a supporting shaft axially projecting from opposite sides relative to a central body of said forming drum;
  transferring said forming drum between at least one loading/unloading location and a work location designed to carry out at least one process working on the forming drum;
wherein at least one of said end portions of the supporting shaft is a driving portion for setting the forming drum in rotation while said at least one process working is being carried out in the work location.

The Applicant thinks that a reduction is therefore possible in the time intervening between the moment the robotized arm gets ready to pick up the forming drum from the loading/unloading location and the moment the execution of the process step really begins on the forming drum in the work location itself. Also reduced is the time intervening between the moment the execution of the process working comes to an end in the work location and the moment the forming drum is released in an exit location associated with the work location.

In accordance with a second aspect, the invention relates to a plant for building tyres for vehicle wheels, comprising:
  at least one forming drum having a supporting shaft axially projecting from opposite sides relative to a central body;
  at least one work location for carrying out at least one process working on the forming drum;
  at least one handling device designed to engage the forming drum and transfer it between at least one loading/unloading location interlocked with the work location and said work location;
  wherein the handling device comprises:
  a grip assembly carrying at least two grip members each engaging the supporting shaft in the vicinity of each of the end portions thereof, and
  at least one motor associated with at least one of said grip members for driving the forming drum in rotation while said at least one process working is being carried out in the work location.

The present invention, in at least one of the aforesaid aspects, can have one or more of the preferred features hereinafter described.

Said at least one of said end portions of the supporting shaft is connected to a motor, concurrently with engagement of the supporting shaft.

During execution of the process working, the forming drum is handled in the work location by said handling device.

Thus it is possible to determine the controlled distribution of an elementary component applied onto the forming drum concurrently with driving in rotation of said forming drum. For instance, a continuous elongated element supplied by an extruder operating in the work location can be distributed on the forming drum in turns disposed mutually approached and/or superposed, according to a pre-set geometrical pattern.

Engagement of the forming drum is carried out by engaging each of the end portions of the supporting shaft between a first jaw and a second jaw that can be moved close to each other for rotatably retaining the supporting shaft.

This solution allows the bulkiness around the building drum to be limited, so as to enable placement of different work locations in reduced spaces.

Engagement of the end portions between said first and second jaws comprises:
  inserting said end portions between the jaws spaced apart from each other in an open condition, said insertion being carried out in a radial direction relative to the supporting shaft;
  moving the jaws close to each other, from the open condition to a closed condition.

Concurrently with said moving close, a kinematic transmission unit is operatively connected to the supporting shaft for driving the forming drum in rotation upon the operation of said at least one end portion.

These preferred solutions too appear to be advantageous for the purpose of limiting the axial bulkiness and the grip speed of the building drum.

Engagement of the ends of the supporting shaft involves closure of at least one of said end portions between mutually approachable first and second rotation bushes rotatably carried by said first and second jaws. While the words "bush" and "bushes" are used throughout the specification, they are intended to convey an identical meaning to, and are used interchangeably with, the words "bushing" and "bushings."

Thus, friction and wear phenomena between the supporting shaft and the jaws following driving in rotation of the forming drum can be reduced.

When the process working has been completed in the work location, the forming drum is released in said loading/unloading location by:
  locking the rotation bush to a stop position wherein the first portion is carried by the first jaw and the second portion is carried by the second jaw;
  mutually moving apart the jaws and said first and second portions for disengaging the supporting shaft from the rotation bush.

The mutual moving apart of the dismountable-bush portions simultaneously with opening of the jaws allows easy disengagement of the forming drum.

The kinematic transmission unit is disconnected from the supporting shaft following moving of the jaws away from each other.

Thus the kinematic transmission unit and the related motor can remain constantly in engagement with the rotation bush even in the open condition of the jaws, so that they are ready to drive the forming drum in rotation following moving of the jaws close to each other to the closed condition.

Rotational locking of the rotation bush relative to the supporting shaft occurs concurrently with moving of the jaws close to each other, so that a rotating motion is transmitted to the supporting shaft following rotation of the rotation bush.

Thus the rotation bush can be utilised for transmitting motion to the forming drum without resorting to additional components.

The handling device comprises a robotized arm for movement of the forming drum in said work location while said at least one process working is being carried out.

Each grip member comprises a first jaw and a second jaw mutually movable between an open condition at which they are spaced apart from each other to receive the supporting shaft in a radial fitting direction, and a closed condition at which they are moved close to each other to rotatably retain the supporting shaft.

Preferably, at least one kinematic-transmission unit is provided which is operatively carried by one of said jaws and operatively connectable to the supporting shaft for driving the forming drum in rotation upon the operation of said motor.

The kinematic-transmission unit appears to be disconnected from and operatively connected to the supporting shaft in the open condition and in the closed condition of the jaws, respectively.

At least one of said grip members comprises a rotation bush for rotatably engaging the supporting shaft.

The rotation bush is rotatably carried by rollers circumferentially distributed around the grip member and rotatably in engagement therewith.

In greater detail, the rotation bush is rotatably carried by at least a first series of rollers rotatably carried by the first jaw and a second series of rollers rotatably carried by the second jaw.

The rollers belonging to said first and second series of rollers respectively, follow one another along a circumferential distribution direction.

Said rotation bush is diametrically divided into at least a first portion and a second portion that can be moved close to each other.

Preferably, devices are provided for locking the rotation bush to a stop position at which the first portion is carried by the first jaw and the second portion is carried by the second jaw.

The kinematic-transmission unit is operatively interposed between said motor and the rotation bush for driving said rotation bush in rotation upon the operation of said motor.

The kinematic-transmission unit comprises at least one driving belt partly passing over the rotation bush.

The driving belt has an inner toothing operatively engaged around a first pulley and a second pulley and an outer toothing in engagement relationship with a mating toothing externally provided on the bush.

Preferably, the motor and the kinematic transmission unit are only associated with one of the grip members, while the other grip member has the respective rotation bush idly mounted on the respective rollers.

Also provided are elements for rotational locking of the rotation bush relative to the supporting shaft, so that a rotating motion is transmitted to the supporting shaft following rotation of the rotation bush.

Said elements for rotational locking comprise a drive pin radially projecting from one of said rotation bush and supporting shaft, for insertion in a fitting seat provided in the other of said rotation bush and supporting shaft.

Preferably, the drive pin is oriented parallel to the direction of mutual approaching of the jaws when the rotation bush is in the stop position.

BRIEF DESCRIPTION OF THE DRAWINGS

Further features and advantages will become more apparent from the detailed description of some preferred but not exclusive embodiments of the present invention. This description will be set out hereinafter with reference to the accompanying drawings, provided by way of example only, in which.

DETAILED DESCRIPTION OF THE INVENTION

With reference to the accompanying drawings, generally identified by reference numeral 1 is a work area being part of a plant for building tyres, of which only the important parts to the aims of the present invention are shown. One or more forming drums 2 are moved in a predetermined path along a building line including one or more work locations, intended for carrying out respective process workings for building a tyre on each of the forming drums.

Figure 1:
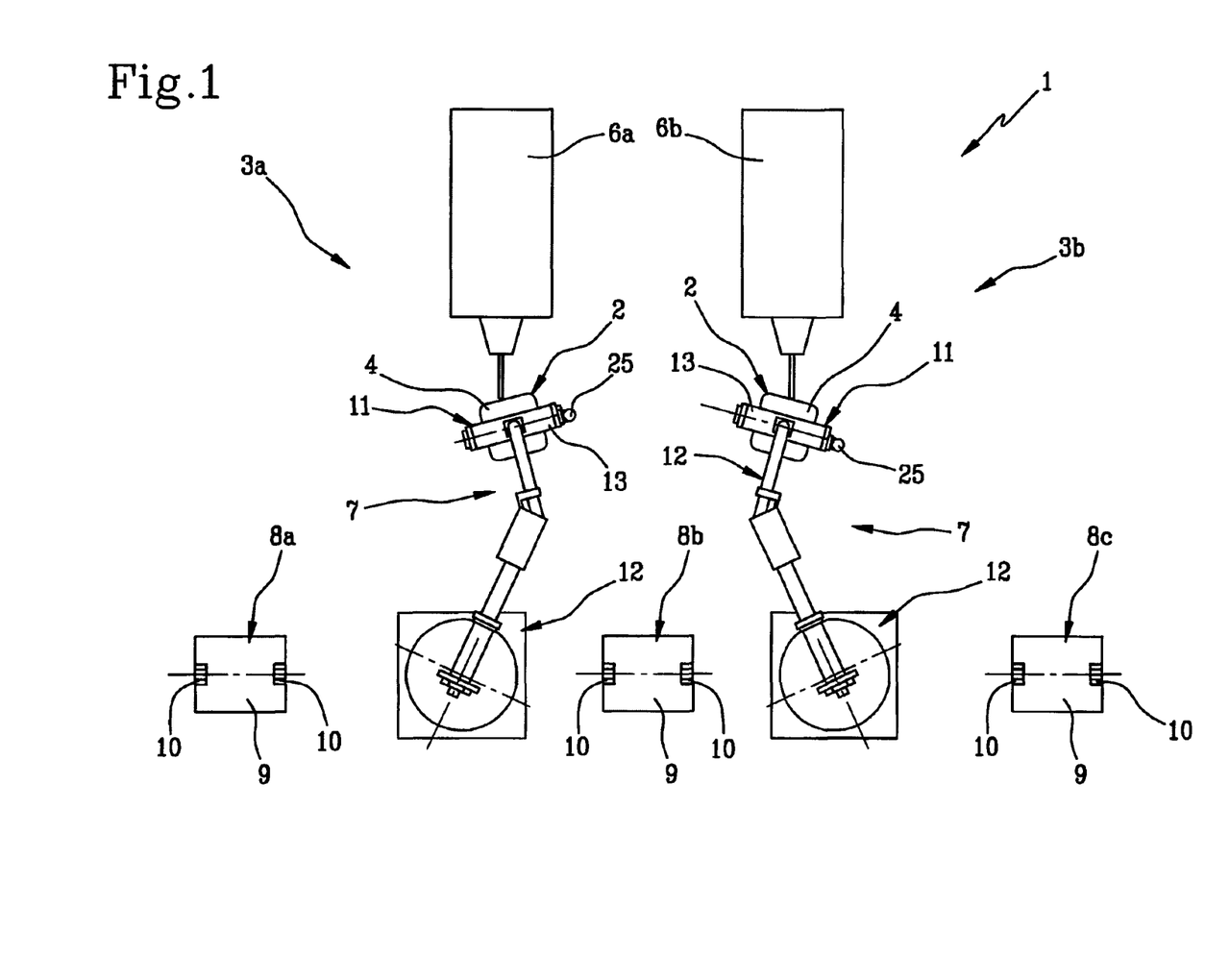
FIG. 1 is a top diagram of a plant for building tyres according to the present invention.

In the example in FIG. 1 a first work location 3a and a second work location 3b that are respectively adjacent are shown; they operate simultaneously each on a respective forming drum 2 for carrying out predetermined process workings aiming at building respective tyres being processed. Further work locations can be provided upstream and/or downstream of said first and second work locations 3a, 3b, along the building line.

Each forming drum 2 has a central body 4 designed to support the tyre being processed and a supporting shaft 5 coaxially projecting on opposite sides relative to the central body 4, for enabling picking up and movement of the forming drum.

Each tyre being processed is directly formed on the respective forming drum 2 by deposition and/or handling of several different components such as one or more carcass plies, annular reinforcing structures to the beads, one or more belt layers, tread band and sidewalls. Each component is preferably directly formed on the central body 4 of the forming drum 2 in addition to previously laid components, and/or suitably handled in accordance with a predetermined process working carried out in the respective work location 3a, 3b, until the finished green tyre to be submitted to a curing treatment is obtained.

In the example in FIG. 1 each of the work locations 3a, 3b comprises an extruder 6a, 6b designed to supply a continuous elongated element of raw elastomeric material on the forming drum 2, as better clarified in the following.

Alternatively, one or more work locations 3a, 3b can have different dispensing units for supplying components of other types, such as individual cords or cords cut to size and gathered together in the form of rubberized strip-like elements, as well as elementary components of other type and/or semi-finished products.

At least one handling device 7 is adapted to engage each forming drum 2 for transferring it between at least one loading/unloading location 8a, 8b, 8c and the work location 3a, 3b with which the loading/unloading location is interlocked.

In the example shown, provision is made for a first loading/unloading location 8a, a second loading/unloading location 8b and a third loading/unloading location 8c, each of which comprises a supporting structure 9 for example, which is adapted to support the forming drum 2 by means of two columns 10 operating on the supporting shaft 5 on respectively opposite sides of the central body 4 and adjacent thereto.

Figure 2:
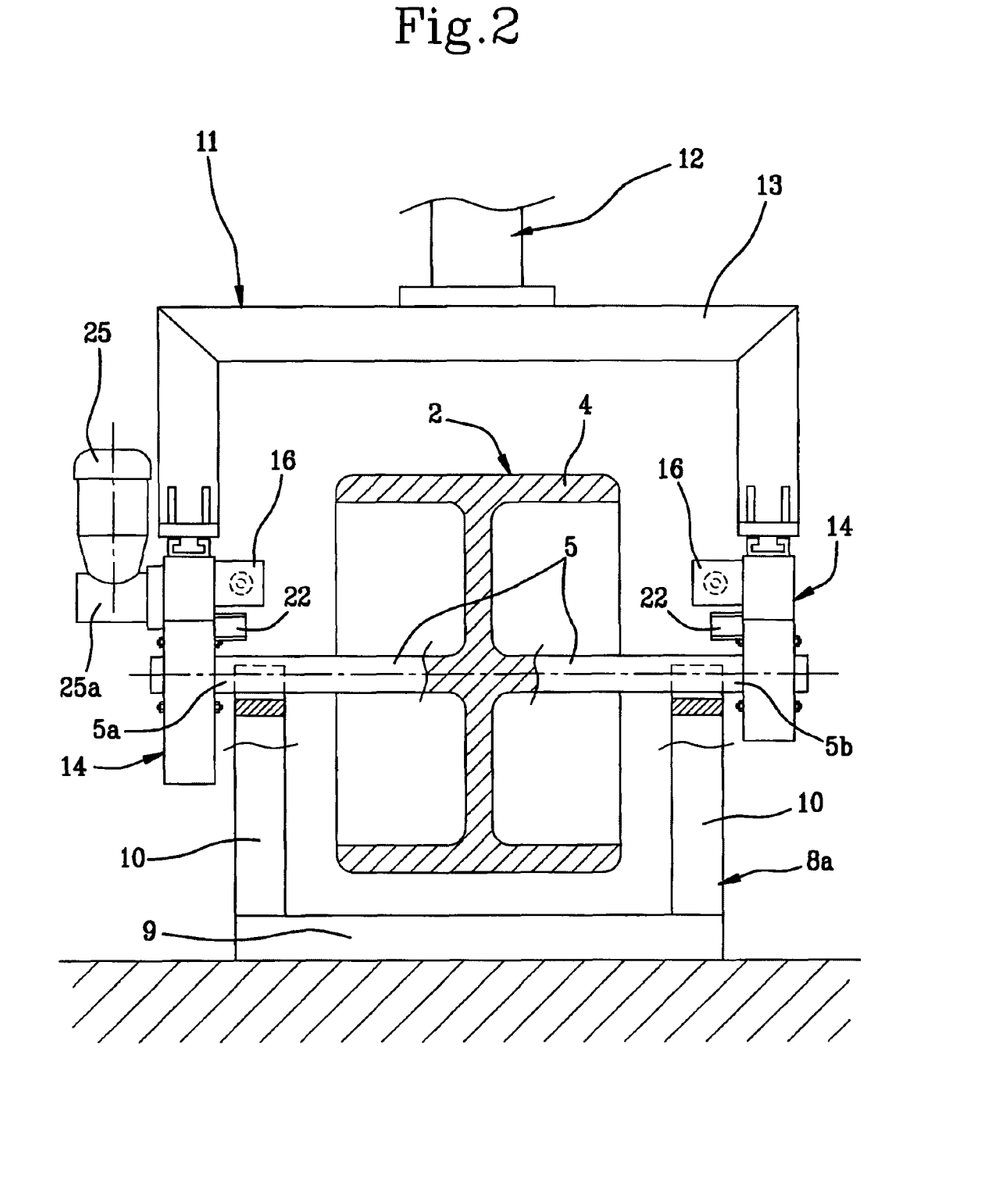
FIG. 2 diagrammatically shows a grip assembly being part of the plant in question, during engagement of a forming drum in a loading/unloading location.

The handling device 7 preferably comprises a grip assembly 11 operatively carried by an actuating unit 12.

The grip assembly 11 is adapted to engage the forming drum 2 at respectively opposite end portions 5a, 5b of the supporting shaft 5. The actuation unit 12 in turn acts on the grip assembly 11 for spatially moving the forming drum 2, so that the latter can be transferred from and to the loading/unloading location 8a, 8b, 8c and handled in the work location 3a, 3b during execution of the process working.

In greater detail, the actuating unit 12 preferably comprises a robotized arm, an anthropomorphous industrial robot for example having three or more axes, preferably at least five axes.

The grip assembly 11 comprises a bridge-shaped supporting beam 13, in engagement with the actuating unit 12 at an intermediate point of its longitudinal extension and carrying at least two grip members 14 projecting on the lower part from the opposite ends of the bridge-shaped beam, so that each of them engages one of the end portions 5a, 5b of the supporting shaft 5.

Figure 3:
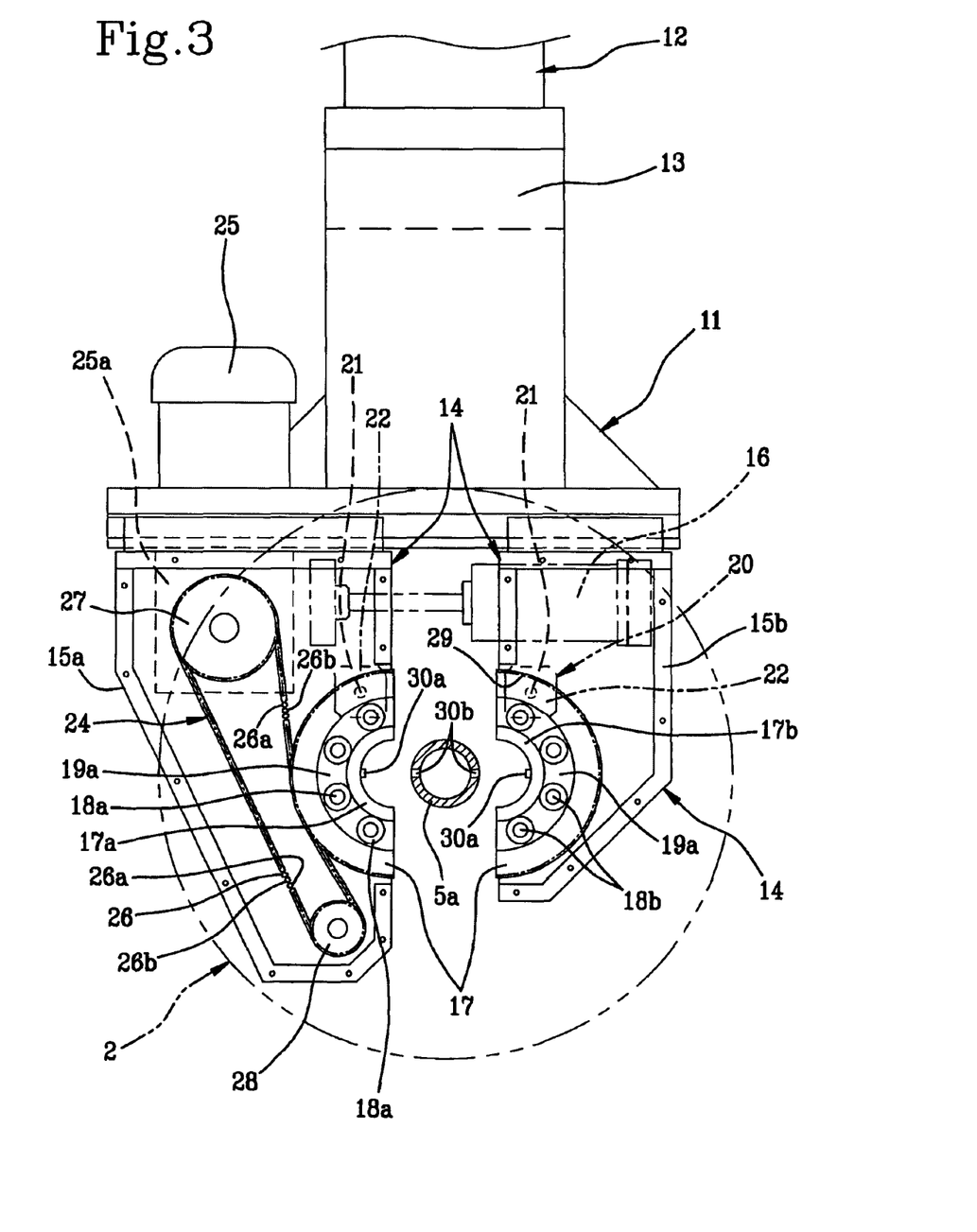
FIG. 3 is a side view of the grip assembly of FIG. 2 with the jaws in an open condition.
Figure 4:
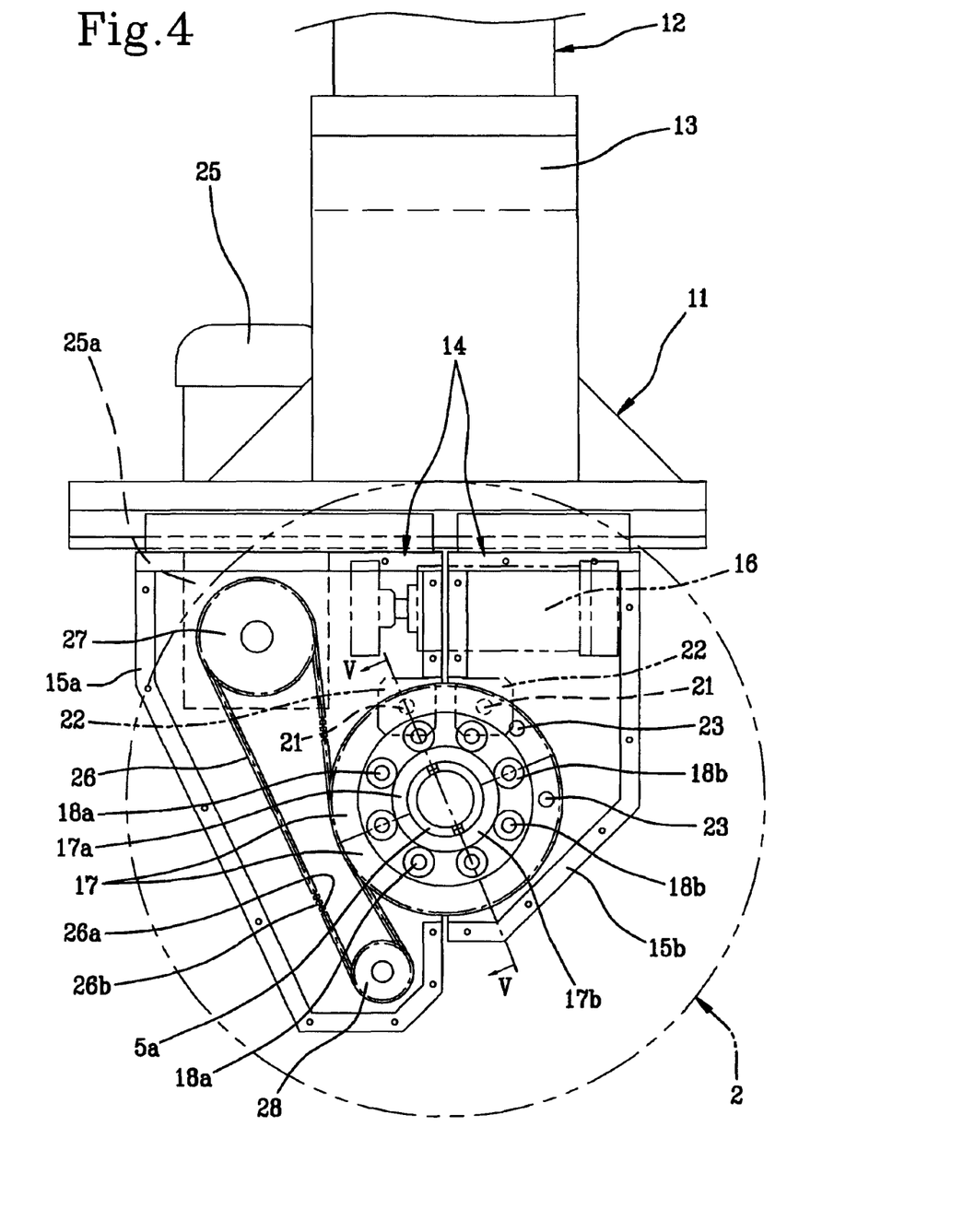
FIG. 4 is a side view of the grip assembly of FIG. 2 with the jaws in a closed condition while the forming drum is being driven in rotation.

To this aim, each grip member 14 has a pair of jaws 15a, 15b that are mutually movable upon command of a fluid-operated actuator 14, for example. The action of the fluid-operated actuator 16 determines the mutual movement of jaws 15a, 15b between an open condition at which they are spaced apart from each other by an amount greater than the diameter of the supporting shaft 5, and a closed condition at which they are disposed close to each other for rotatably retaining the supporting shaft 5, preferably at a rotation bush 17 provided between said first and second jaws 15a, 15b.

The rotation bush 17, diametrically divided into at least one first portion 17a and one second portion 17b that can be mutually moved close, is rotatably carried by rollers 18a, 18b circumferentially distributed and rotatably engaged with the grip member 14.

In greater detail, provision is made for at least one first series of rollers 18a, rotatably carried by the first jaw 15a and one second series of rollers 18b rotatably carried by the second jaw 15b. When jaws 15a, 15b are in the closed condition, rollers 18a, 18b belonging to the first and second series respectively follow each other along a circumferential distribution direction.

Figure 5:
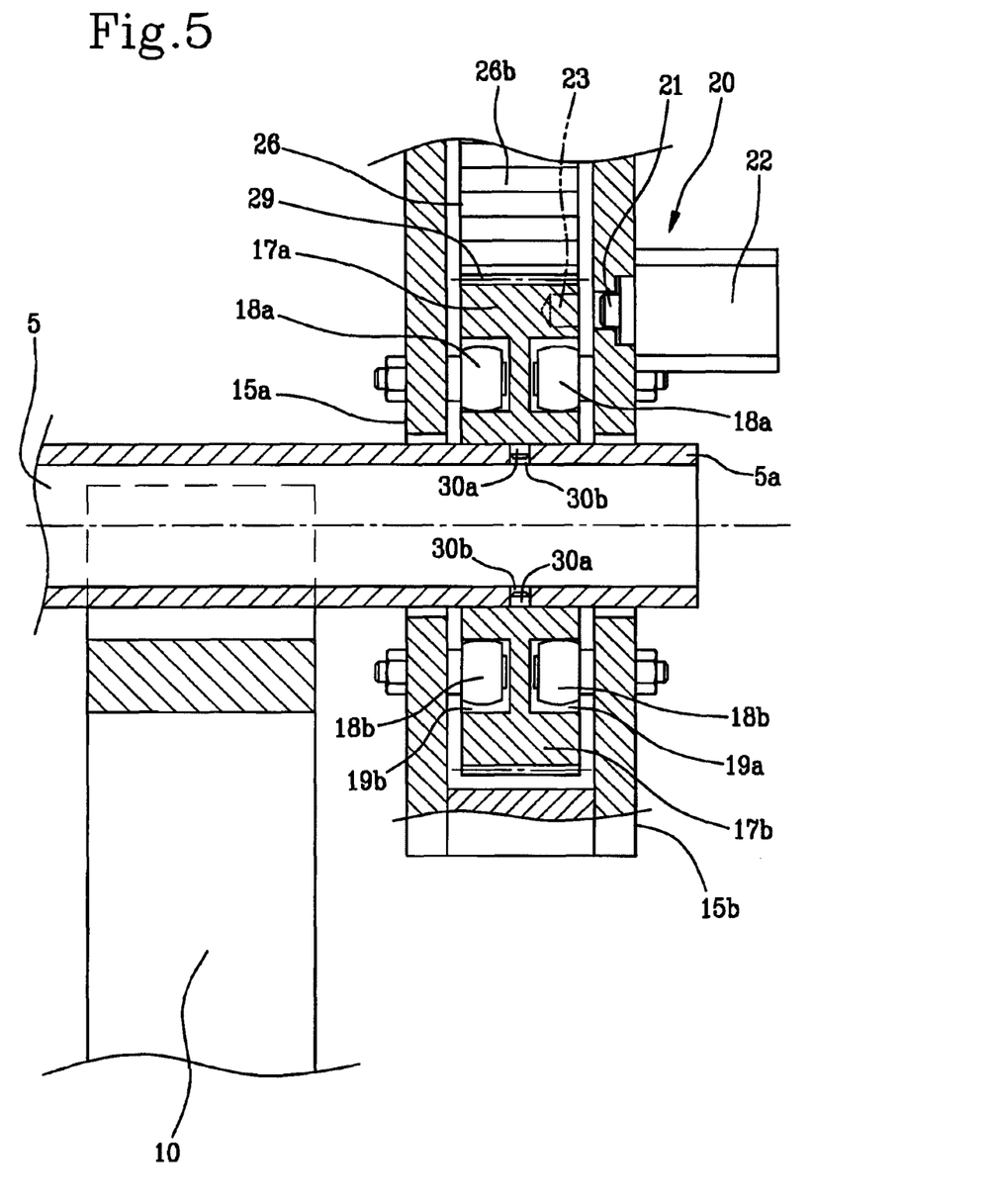
FIG. 5 shows a detail of the grip assembly of FIG. 2 sectioned along line V-V in FIG. 4.

More specifically, each of the first and second series of rollers 18a, 18b preferably comprises pairs of axially opposite rollers, operatively engaged in guide races 19a, 19b formed on axially opposite sides of the rotation bush 17.

Also preferably provided are devices 20 for locking the rotation bush 17 in a stop position at which the first portion 17a is carried by the first jaw 15a and the second portion 17b is carried by the second jaw 15b, as clearly shown in FIGS. 3 and 4. More particularly, in the stop position the approaching plane of the first and second portions 17a, 17b of the rotation bush 17 is preferably perpendicular to the direction of mutual moving close and away of jaws 15a, 15b, so as to enable movement of said jaws between the open and closed conditions.

In the example shown the locking devices 20 comprise preferably for each of the portions of the rotation bush 17, at least one pin 21 axially movable upon command of an actuator 22 integral with the respective jaw 15a, 15b, for being fitted in a locking seat 23 provided in the rotation bush 17.

Also integrated into at least one of the grip members 14 is a kinematic transmission unit 24 that can be operatively connected to the supporting shaft 5 to drive the forming drum 2 in rotation upon command of a motor 25 associated with the grip member itself.

In greater detail, the kinematic transmission unit 24 is operatively interposed between motor 25 and rotation bush 17 to drive the latter in rotation upon command of said motor 25. To this aim, the kinematic transmission unit 24, preferably housed in one of jaws 15a, 15b, jaw 15a as shown in FIG. 3 for example, comprises at least one driving belt 26, preferably a toothed belt. The driving belt 26 has an inner toothing 26a operatively engaged around a first pulley 27 carried by a reduction gear 25a associated with motor 25, and around a second pulley 28 operating close to the lower end of the respective jaw 15a. A stretch of the driving belt 26 is partly wrapped around the rotation bush 17, with an outer toothing 26b in engagement relationship with a mating toothing 29 externally provided on the bush itself.

The kinematic transmission unit 24 can be made in a manner different from the described one, by use of a gear train instead of the driving belt 26. However the Applicant thinks that use of the driving belt 26 is preferred, at least for the purpose of reducing weight.

Preferably, motor 25 and the kinematic transmission unit 24 are only associated with one of the grip members 14, while the other grip member 14 has the respective rotation bush 17 idly mounted on the respective rollers 18a, 18b.

Also preferably provided are elements for rotationally locking the rotation bush 17 relative to the supporting shaft 5 of the forming drum 2, for example comprising a drive pin 30a radially projecting from the rotation bush 17 or the supporting shaft 5, for insertion in a fitting seat 30b provided in the supporting shaft 5 or the rotation bush 17, respectively.

In the embodiment shown, each rotation bush 17 has two drive pins 30a, each of which radially projects from the inside of the respective first and second portions 17a, 17b of the rotation bush and is oriented parallel to the mutual approaching direction of jaws 15a, 15b when the rotation bush 17 is in the stop position.

During the building process, a forming drum 2 to be submitted to the process working in the first work location 3a, possibly coming from a preceding work location, is provided in the first loading/unloading location 8a.

The forming drum 2 provided in the first loading/unloading location 8a is ready to be picked up by the handling device 7 associated with the first work location 3a to be submitted to the process working in the first work location 3a itself.

To this aim, the handling device 7 associated with the first work location 3a brings its grip assembly 11 close to the first loading/unloading location 8a and positions each of the grip members 14 above one of the end portions 5a, 5b of the supporting shaft 5 axially projecting from columns 10 of the supporting structure 9.

By a descent movement of the grip assembly 11, each of the end portions 5a, 5b of the supporting shaft 5 is radially inserted between the first jaw 15a and the second jaw 15b of the respective grip member 14, set in the open condition. The fluid-operated actuators 16 associated with each of the grip members 14 operate the mutual approaching of jaws 15a, 15b from the open condition to the closed condition, so as to determine engagement of the supporting shaft 5 by the grip assembly 11.

In greater detail, by the mutual approaching of jaws 15a, 15b, each of the end portions 5a, 5b of the supporting shaft 5 is operatively engaged between the first portion 17a and the second portion 17b of the respective rotation bush 17, becoming mutually joined when the closed condition is reached.

Preferably, when engagement has occurred, each of the end portions 5a, 5b axially projects relative to the grip member 14.

Simultaneously, the drive pins 30a are inserted in the respective fitting seats 30b provided in the end portions 5a, 5b of the supporting shaft 5.

Each rotation bush 17 is therefore rotationally locked relative to the supporting shaft 5. One of the end portions 5a, 5b of the supporting shaft 5, engaged by the grip member 14 carrying the kinematic transmission unit 24 is therefore connected to the kinematic transmission unit 24 itself, and consequently with motor 25, concurrently with engagement of the supporting shaft 5 following moving close of jaws 15a, 15b to the closed condition. In the example shown in FIGS. 3 and 4, the end portion 5a is therefore a driving portion for setting the forming drum 2 in rotation during execution of the process working in the first work location 3a. The other end portion 5b, engaged by the grip member 14 devoid of the kinematic transmission unit 24 is adapted to drive the respective rotation bush 17 in rotation.

The handling device 7 is therefore suitable to remove the forming drum 2 from the first loading/unloading location 8a and transfer it to the first work location 3b for carrying out the process working.

During the process working, the forming drum 2 is set in rotation upon command of motor 25 and through the kinematic transmission unit 24, so that the continuous elongated element coming from extruder 6a and/or other components fed to the work location 3a can be circumferentially distributed around the surface of the central body 4. At the same time, by displacements imparted to the grip assembly 11 by the actuating unit 12, the forming drum 2 can be translated parallel to and/or transversely relative to its rotation axis, and angularly oriented in different axes according to a predetermined program, so as to form an elastomeric component of desired shape and thickness for example, by distributing the continuous elongated element from the extruder 6a according to turns suitably disposed close to each other and/or superposed.

When execution of the process working in the first work location 3a has been completed, rotation of the forming drum 2 is stopped and the actuating unit 12 brings said drum back to the first loading/unloading location 8a or the adjacent second loading/unloading location 8b.

More specifically, rotation of the forming drum 2 is stopped to such an angular position that alignment is determined between the locking seats 23 provided in the rotation bushes 17 and the respective pins 21 that are driven by actuators 22, so as to cause locking of said bushes to the stop position adapted to enable mutual spacing apart of jaws 15a, 15b to the open condition.

The fluid-operated actuators 16 therefore determine mutual moving apart of jaws 15a, 15b to the open condition and consequently moving apart of the first and second portions 17a, 17b of each rotation bush 17, to allow the supporting shaft 5 to be disconnected from the rotation bushes and the kinematic transmission unit 24.

The grip assembly 11 being moved up and apart by the actuating unit 12, the forming drum 2 is released at the second loading/unloading location 8b, for example.

The forming drum 2 is thus adapted to be picked up again by a further handling device 7 associated with the second work location 3b to be submitted to a following process working and subsequently released to the third loading/unloading location 8c.

As shown in FIG. 1 by way of example, use of the grip members 14 designed to engage the forming drum 2 by radial insertion on the end portions 5a, 5b of the supporting shaft 5 enables an important bulkiness reduction along the rotation axis of the drum itself, so as to allow closely spaced positioning of several work locations 3a, 3b simultaneously operating on respective forming drums 2.

The invention claimed is:

1. A process for building a tyre, comprising:
engaging a forming drum, designed to carry a tyre and having a supporting shaft axially projecting from opposite sides of the forming drum, by a handling device, the handling device comprising first and second jaws each housing a portion of a rotation bushing configured to engage one of opposite end portions of the supporting shaft, the engaging comprising:
moving the first and second jaws toward each other on opposite radial sides of the supporting shaft,
coincident with said moving, inserting a drive pin in a fitting seat between one of the portions of the rotation bushing and the supporting shaft by moving the first and second jaws together linearly, the insertion rotationally locking said one of the portions of the rotation bushing relative to the supporting shaft, and
associating a driving mechanism housed in one of the jaws with the supporting shaft;
transferring said forming drum between a loading/unloading location and a work location designed to carry out a process step of the work location on the forming drum; and
setting the forming drum in rotation by rotating the rotation bushing with said driving mechanism while said process step of the work location is being carried out in the work location, wherein the steps of transferring said forming drum and setting the forming drum in rotation are carried out by holding the one end portion of the supporting shaft with the first and second jaws and the other, opposite end portion of the supporting shaft with a pair of jaws of the handling device.

2. The process as claimed in claim 1, wherein the one of said end portions of the supporting shaft is connected to a motor concurrently with the engagement of the supporting shaft.

3. The process as claimed in claim 1, wherein concurrently with engaging the forming drum, a kinematic transmission unit is operatively connected to the supporting shaft.

4. The process as claimed in claim 1, wherein, when the process step of the work location has been completed in the work location, the forming drum is released by:
locking the rotation bushing to a stop position wherein the respective first and second portions of the bushing are housed by the respective first and second jaws; and
mutually moving apart the first and second jaws and bushing portions.

5. The process as claimed in claim 3, wherein the kinematic transmission unit is disconnected from the supporting shaft by separating the first and second jaws from each other.

* * * * *